(12) United States Patent
Ahmadi et al.

(10) Patent No.: US 9,819,143 B2
(45) Date of Patent: Nov. 14, 2017

(54) METHOD AND APPARATUS FOR POLARIZATION DETERMINATION AND/OR CONTROL IN OPTICAL FIBER AMPLIFYING SYSTEMS

(71) Applicant: NUFERN, East Granby, CT (US)

(72) Inventors: Peyman Ahmadi, Manchester, CT (US); Imtiaz Majid, Shrewsbury, MA (US); Cyril Guintrand, Woodbury, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 14/899,991

(22) PCT Filed: Jun. 23, 2014

(86) PCT No.: PCT/US2014/043693
§ 371 (c)(1),
(2) Date: Dec. 18, 2015

(87) PCT Pub. No.: WO2014/205444
PCT Pub. Date: Dec. 24, 2014

(65) Prior Publication Data
US 2016/0141828 A1 May 19, 2016

Related U.S. Application Data

(60) Provisional application No. 61/838,145, filed on Jun. 21, 2013.

(51) Int. Cl.
*H01S 3/067* (2006.01)
*H01S 3/13* (2006.01)
(Continued)

(52) U.S. Cl.
CPC ............ *H01S 3/1308* (2013.01); *G02B 6/024* (2013.01); *H01S 3/0064* (2013.01);
(Continued)

(58) Field of Classification Search
CPC ............ H01S 3/06754; H01S 3/06758; H01S 3/1301; H01S 3/1308; H01S 3/10061
See application file for complete search history.

(56) References Cited

U.S. PATENT DOCUMENTS 6,282,016 B1 * 8/2001 MacCormack ..... H01S 3/06758
359/341.4
8,537,459 B2 * 9/2013 Nati .................... H01S 3/06758
359/333
(Continued)

OTHER PUBLICATIONS

Imai, "Polarization characteristics of amplified Rayleigh backscattered light in erbium-doped optical fibers", Optical Engineering vol. 37, pp. 543-546 (1998).*
(Continued)

*Primary Examiner* — Eric Bolda
(74) *Attorney, Agent, or Firm* — McDonnell Boehnen Hulbert & Berghoff LLP

(57) ABSTRACT

Methods and apparatuses for determining the polarization state and for providing polarization control in optical fiber lasers and amplifiers. One embodiment of the invention is an optical fiber amplifying system including a circulator (260) having a first optical port (260a), a second optical port (260b) that is configured to output radiation received from the first optical port, and a third optical port (260c) that is configured to output radiation received from the second optical port; one or more amplifier stages (216) connected in series, together having an optical input (216a) optically coupled to the second port of the circulator, and an optical output (216b); and a polarization detector (240) having an optical input optically coupled to the third port of the circulator. Thereby the polarization state of the amplified radiation can be determined using radiation backscattered from the amplifying stage.

26 Claims, 5 Drawing Sheets

(51) Int. Cl.
  *H01S 3/10* (2006.01)
  *G02B 6/024* (2006.01)
  *H01S 3/00* (2006.01)

(52) U.S. Cl.
  CPC ...... *H01S 3/06754* (2013.01); *H01S 3/10015* (2013.01); *H01S 3/10061* (2013.01); *H01S 3/1301* (2013.01); *H01S 3/005* (2013.01); *H01S 3/0675* (2013.01); *H01S 3/06758* (2013.01)

(56) References Cited

U.S. PATENT DOCUMENTS

| | | | | |
|---|---|---|---|---|
| 2005/0259241 | A1* | 11/2005 | Tanigawa | G01M 11/3181 356/73.1 |
| 2008/0030720 | A1* | 2/2008 | Goto | G01M 11/3145 356/73.1 |
| 2009/0244522 | A1* | 10/2009 | Cyr | G01M 11/3181 356/73.1 |
| 2013/0063808 | A1* | 3/2013 | Rothenberg | H01S 3/1307 359/334 |
| 2014/0071436 | A1* | 3/2014 | Cyr | G01N 21/21 356/73.1 |
| 2015/0109605 | A1* | 4/2015 | Major, Jr. | G01S 7/4811 356/28 |

OTHER PUBLICATIONS

Imai Y ED, "Polarization Characteristics of Amplified Rayleigh Backscattered Light in Erbiom-Doped Optical Fibers," Optical Engineering, Soc. of Photo-Optical Instrumentation Engineers, Bellingham, vol. 37, No. 2, Feb. 1, 1998, pp. 543-546.

Sunnerud, et al., "Polarization-mode dispersion measurements along installed optical fibers using gated backscattered light and a polarimeter," Journal of Lightwave Technology, IEEE Service Center, New York, NY, US, vol. 18, No. 7, Jul. 1, 2000, pp. 897-904.

Bonaccini Calia, "AFIRE:fiber Raman laser for laser guide star adaptive optics," Proceedings of SPIE, vol. 6272, 2006, pp. 62721M-1-12.

International Search Report dated Sep. 15, 2014 of International Application No. PCT/US2014/043693 filed Jun. 23, 2014, 5 pages.

International Preliminary Report on Patentability dated Dec. 22, 2015 of International Application No. PCT/U52014/043693 filed Jun. 23, 2014, 9 pages.

* cited by examiner

METHOD AND APPARATUS FOR POLARIZATION DETERMINATION AND/OR CONTROL IN OPTICAL FIBER AMPLIFYING SYSTEMS

CROSS-REFERENCE TO RELATED APPLICATIONS

This application is a U.S. national phase application of International Patent Application No. PCT/US2014/043693 filed on Jun. 23, 2014, which claims the priority of U.S. Provisional Patent Application Ser. No. 61/838,145, entitled "Method and Apparatus for Polarization Determination and/or Control in Optical Fiber Amplifying Systems" and filed on Jun. 21, 2013, which is hereby incorporated herein by reference in its entirety.

BACKGROUND OF THE INVENTION

1. Field of the Invention

The present invention relates generally to optical fiber lasers and amplifiers. The present invention relates more particularly to methods and apparatuses for determining the polarization state and for providing polarization control in optical fiber lasers and amplifiers.

2. Technical Background

Optical fiber lasers and amplifiers are known in the art. In such lasers and amplifiers, rare earth materials disposed in the core of the optical fiber therein absorb pump radiation of a predetermined wavelength, and, in response thereto, provide or amplify light of a different wavelength for propagation in the core. For example, the well-known erbium doped fiber amplifier receives pump radiation having a wavelength of 980 or 1480 nm, and amplifies optical radiation propagating in the core and having a wavelength of about 1550 nm. Lasers and amplifiers generally include one or more amplifier stages, each including a length of fiber that is coupled to one or more pump radiation sources (e.g., pump lasers) and configured to amplify optical radiation passing through its core.

In many cases it can be desirable to characterize the polarization state of the output beam of an amplifier stage, for example, for alignment with other optical elements (either within the laser system or external thereto), or to provide for control of the polarization state of the output beam of the amplifier stage. One conventional technique for characterizing an output beam of an optical fiber amplifier stage is to interrogate the output beam using an optical wedge (or other optical tap) at the optical output of the amplifier stage. The pickup wedge (or other optical tap) will split off a pickup beam from the main output of the optical output of the amplifier stage, which can be used, for example, in polarization monitoring or control. An example of such a system is shown schematically in FIG. 1.

The system of FIG. 1 includes an amplifier system 110, which includes a high power amplifying stage 116. A seed laser 112 is configured to provide input radiation to a polarization controller 113, which is configured to pass polarized radiation to the high power amplifying stage 116. An optical tap 120 (shown here as a free-space optic pickup wedge, but also conventionally provided as a fiber tap) picks out a small fraction of the radiation 150 output from the amplifier system 110 for use in polarization determination and control. In the example of FIG. 1, beam splitter 125 (shown here as a free-space optic beamsplitter, but also conventionally provided as a fiber coupler) splits this tapped radiation and sends it to a polarization determination subsystem 130 and a polarization control system 140. The polarization determination subsystem is configured, for example, to provide an external indication of the polarization state of the output radiation 150, e.g., to a user or an external system. The polarization control system 140 is operatively coupled back to the polarization controller 113, and can be configured to provide feedback control of the polarization state of the output radiation 150.

One important drawback for this type of system is the need to place an optical tap (i.e., the pickup wedge or other optical tap) in the radiation 150 outputted from the amplifier stage. This can provide an additional point of failure of the system, especially when the power outputted by the amplifier stage is high. Moreover, including a pickup wedge or other optical tap in the output radiation can degrade the output beam quality. This can be especially disadvantageous when radiation from multiple amplifier systems needs to be combined, especially when such combination must be performed coherently. An optical element in the output radiation of the amplifier stage can distort the wavefront and thus hinder beam combination efficiency.

Accordingly, there remains a need for improved optical amplifying and laser systems that can provide polarization-controlled output while addressing one or more of these drawbacks.

SUMMARY OF THE INVENTION

One aspect of the present invention is an optical fiber amplifying system comprising
  a circulator, the circulator comprising
    a first optical port,
    a second optical port that is configured to output radiation received from the first optical port, and
    a third optical port that is configured to output radiation received from the second optical port;
  one or more amplifier stages connected in series, together having an optical input optically coupled to the second port of the circulator, and an optical output; and a polarization detector having an optical input optically coupled to the third port of the circulator, and a detector output configured to output a polarization detector output signal.

Another aspect of the invention is a method for controlling the polarization of an optical output of an amplifying stage of an optical fiber amplifying system, the amplifying stage having an optical input, the optical fiber amplifying system further comprising a polarization controller having an optical input and an optical output optically coupled to the optical input of the amplifying stage, the method comprising
  detecting the polarization state of radiation backscattered from the amplifying stage through its optical input to create a polarization detector output signal;
  transmitting the polarization detector output signal to the polarization controller; and
  controlling the polarization of radiation output from the optical output of the polarization controller based on the polarization detector output signal.

Another aspect of the invention is a method for determining the polarization state of an optical output of an amplifying stage of an optical fiber amplifying system, the amplifying stage having an optical input, the method comprising
  detecting the polarization state of radiation backscattered from the amplifying stage through its optical input to create a polarization detector output signal; and determining the polarization state of the optical output of the amplifying stage using the polarization detector output signal.

Any of the features described herein in conjunction with any one aspect or embodiment described herein can be combined with a practice of the invention according to any other of the aspects or embodiment described herein, as would be evident to the person of ordinary skill in the art in view of the present disclosure.

As the person of ordinary skill in the art will appreciate, the drawings are not necessarily drawn to scale, and various elements of the systems may in certain drawings be omitted for purposes of clarity.

DETAILED DESCRIPTION OF THE INVENTION

Figure 2:
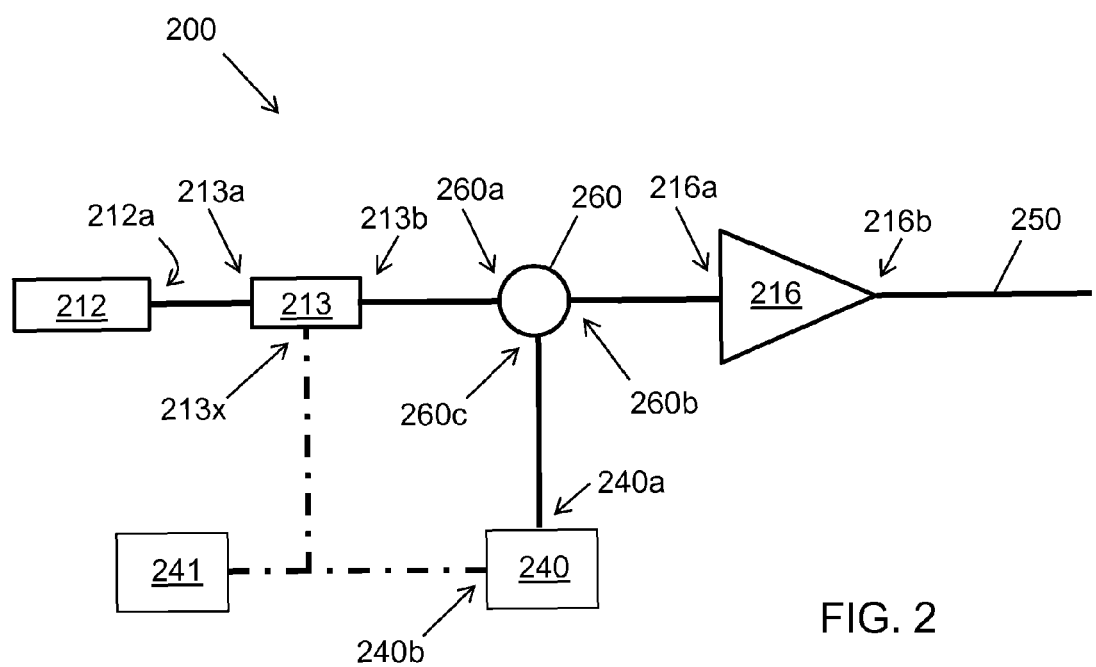
FIG. 2 is a schematic view of an optical fiber amplifying system according to one embodiment of the invention.

One aspect of the present invention is an optical fiber amplifying system. As the person of ordinary skill in the art will appreciate in view of the present description, the optical fiber amplifying system can be configured in a variety of fashions, for example, as a high power laser system. One embodiment of an optical fiber amplifying system is shown in schematic view in FIG. 2. The optical fiber amplifying system 200 includes a circulator 260, which includes a first optical port 260a, a second optical port 260b, and a third optical port 260c. In certain embodiments, and as shown in FIG. 2, the optical fiber amplifying system 200 can also include a polarization controller 213 having an optical input 213a and an optical output 213b. The second optical port 260b of the circulator is configured to output radiation received from the first optical port 260a. An amplifying stage 216 has an optical input 216a, which is optically coupled to the second optical port 260b of the circulator. The amplifying stage 216 also includes an optical output 216b, which can, for example, provide an output 250 for the overall system. The third optical port 260c of the circulator is configured to output radiation received from the second optical port 260b, and is optically coupled to an optical input 240a of a polarization detector 240. The first optical port 260a can be optically coupled to the optical output 213b of the polarization controller 213, if it is present. Thus, the circulator 260 is configured to transmit optical radiation received at the first optical port 260a (e.g., from the optical output 213b of the polarization controller) to input 216a of the amplifying stage; and is configured to transmit optical radiation received from the optical input 216a of the amplifying stage to the polarization detector 240. In certain embodiments, the system can also include a processor 241 (e.g., a computer or microprocessor) configured to determine the polarization state of the optical output of the amplifying stage 216 using the polarization detector output signal.

In certain embodiments, the system can also include a seed laser optically coupled to the input port 260a of the circulator. For example, in the embodiment shown in FIG. 2, the system includes a seed laser 212 having an output 212a optically coupled to the optical input 213a of the polarization controller 213. The use of seed lasers in optical fiber amplifying systems such as fiber lasers is familiar to the person of ordinary skill in the art. As the person of ordinary skill in the art will appreciate, however, the input radiation for the polarization controller and the amplifying stage can come from a variety of different types of sources, and even in cases where a seed laser is present, other optical elements can be provided in the optical path between the seed laser and the circulator.

Figure 1:
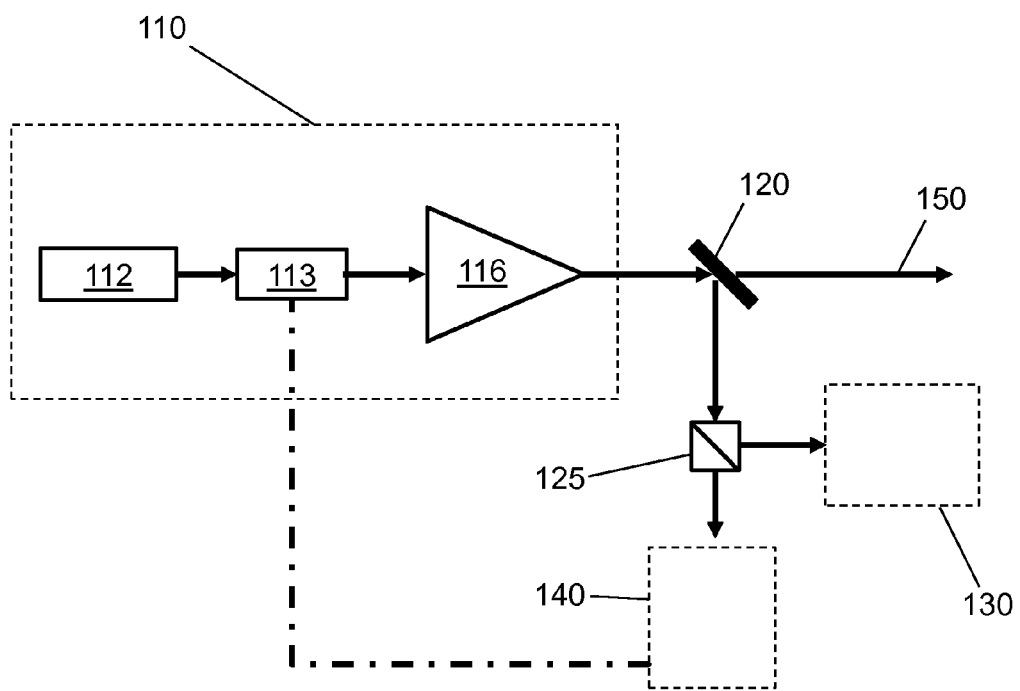
FIG. 1 is a schematic view of a conventional system for polarization monitoring and control of an optical fiber amplifier stage.

In certain aspects of the invention, instead of including an optical tap to interrogate the polarization state of the output of the amplifying stage as described above with respect to FIG. 1, the polarization state of the amplified radiation is advantageously determined using radiation backscattered from the amplifying stage. As the person of ordinary skill in the art will appreciate, Brillouin scattering is generally understood to be a non-linear acousto-optic effect in which, responsive to electromagnetic energy propagating in the forward direction, electromagnetic energy is scattered in the backward direction accompanied by the release of phonon energy. The backward propagating electromagnetic energy is shifted in frequency from the forward propagating electromagnetic energy. Amplification of optical signals, especially at high powers, can result in significant Brillouin scattering. While it can be desirable to avoid significant amounts of Brillouin scattering, in real-world devices there will nearly always be detectable levels of Brillouin scattering. The person of ordinary skill in the art will appreciate that other mechanisms (e.g., Rayleigh scattering, Raman scattering) can also cause backscattering of radiation (e.g., of different wavelengths from the amplified wavelength). Depending on the particular system, the person of ordinary skill in the art can use any of these types of backscattered radiation in the practice of various aspects of the invention described herein.

In the embodiment of FIG. 2, the backscattered light from the amplifier stage (here, Brillouin scattering) is output from the amplifying stage at input 216b (i.e., because it propagates in a direction opposite that of amplified radiation) and transmitted by the circulator 260 to the polarization detector 240. The backscattered radiation correlates with the polarization state of the amplifier stage's output (see, e.g., G. D. Goodno et al., "Active phase and polarization locking of a 1.4 kW fiber amplifier," Optics. Letts., vol. 35, 1542-44 (2010), which is hereby incorporated herein by reference in its entirety for all purposes, including its description of phase and polarization locking). Accordingly, the backscattered radiation can be used to diagnose the polarization state of the output of the amplifier system.

In certain embodiments, the device can be configured to provide for feedback control or locking of the polarization state of the output. For example, in one embodiment, and as shown in FIG. 2, the polarization controller 213 further includes a controller input 213x, and the polarization detector 240 further includes a detector output 240b configured to output a polarization detector output signal and coupled to the controller input 213x of the polarization controller. The polarization controller can be configured to control the polarization of an input signal coupled from its optical input to its optical output based on the polarization detector output signal received at the controller input. Accordingly, the polarization detector output signal can be used in a feedback loop to control the polarization of the input radiation to the amplifier stage (here, through polarization control of the radiation output by the seed laser). In certain embodiments, the polarization of the input signal is controlled to be polarization-matched to the polarization state of the backscattered light. The person of ordinary skill in the art will use conventional polarization-locking techniques in practicing the methods described herein.

Figure 3A:
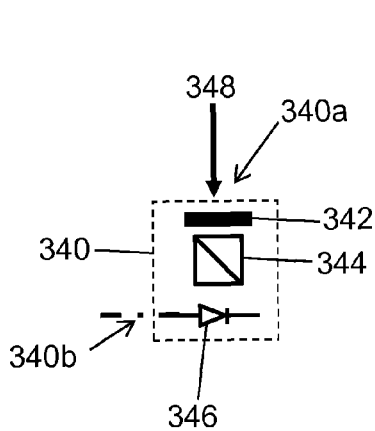
FIG. 3A is a schematic view of a polarization detector suitable for use in certain embodiments of the invention.
Figure 3B:
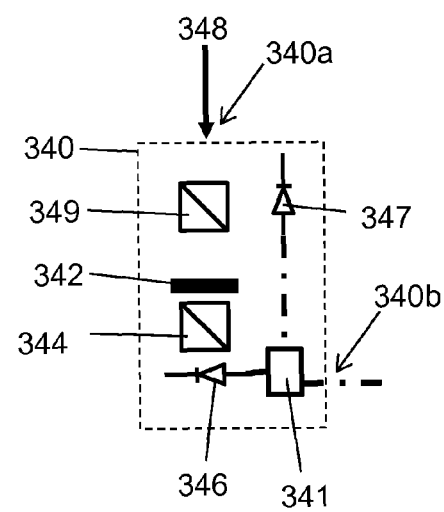
FIG. 3B is a schematic view of another polarization detector suitable for use in certain embodiments of the invention.

The polarization detector can be configured by the person of ordinary skill in the art to determine the polarization state of the backscattered radiation. For example, in one embodiment, shown in schematic view in FIG. 3A, a polarization detector 340 includes a half-wave plate 342, a polarizing beam splitter 344, and a photodiode 346. Arrow 348 indicates the direction of radiation input to the device, and the polarization detector input and output are indicated by reference numerals 340a and 340b. Of course, other configurations can be used. For example, the person of ordinary skill in the art can also configure the polarization detector 340 to include the backscattered power in the calculation of the polarization state of the backscattered radiation, so that a change in polarization can be distinguished from a change in power. Such a device is shown in schematic view in FIG. 3B. The polarization detector of FIG. 3B further includes a beam splitter 349, which splits the backscattered radiation between a polarization detector substantially as described with respect to FIG. 3A and a photodiode 347. The person of ordinary skill in the art will appreciate that a fiberized splitter (e.g., a 1×2 coupler) can be used instead of the free space optical beamsplitter. The outputs of photodiodes 346 and 347 can be compared (e.g., by comparator circuit 341) in order to provide a polarization detector output signal that provides, for example, the polarization state of the backscattered radiation independent of any power fluctuations in the backscattered radiation. The person of ordinary skill in the art will appreciate that the polarization detector output signal can be, for example, optical or electrical (digital or analog) in nature, and can be configured to provide information regarding the polarization state of the signal detected by the polarization detector, to the polarization controller or to other devices (e.g., an external controller, to a processor 241 as described with respect to FIG. 2, and/or to a display or recording system).

The various elements (e.g., the seed laser, the polarization controller, the circulator and the amplifying stage) of the optical fiber amplifying systems described herein can be interconnected, for example, using optical fibers through conventional techniques familiar to the person of ordinary skill in the art.

In certain embodiments, one or more preamplifying stages are coupled in the optical path that is coupled to the circulator at its first optical port. For example, in certain embodiments in which a polarization controller is present, one or more preamplifying stages can be coupled in the optical path between the polarization controller and the first optical port of the circulator. For example, one such embodiment is shown in schematic view in FIG. 4. Here, the output of seed laser 412 is controlled by polarization controller 413, then passed to the preamplifying stage 418. The output of the preamplifying stage is coupled to the input port of the circulator 460; the device is otherwise configured as described above with respect to FIG. 2 (e.g., with respect to the configuration of polarization detector 440). The use of multiple amplification stages in an optical fiber amplifying system is familiar to the person of ordinary skill in the art, and the person of ordinary skill in the art will appreciate that more than one preamplifying stage can be provided between the polarization controller and the circulator; and/or more than one amplifying stage can be provided in series after the second optical port of the circulator. The person of ordinary skill in the art will appreciate that isolators can be positioned between amplifying stages in order to prevent backwards propagation of amplified radiation.

As the person of ordinary skill in the art will appreciate, the amplifying stages and preamplifying stages used in the systems described herein can take a variety of forms. Each amplifying stage and preamplifying stage can generally include a length of amplifying optical fiber and one or more pump sources optically coupled to the amplifying optical fiber and configured to pump the optical fiber to provide optical gain to radiation passing therethrough. The amplifying optical fibers can be, for example, rare earth doped fibers (e.g., Er-doped, Yb-doped, Er/Yb-doped, Tm-doped, desirably in the form of double-clad fiber), as are familiar to the person of ordinary skill in the art. In other embodiments, the amplifying optical fiber is configured to provide amplification via stimulated Raman scattering, also familiar to the person of ordinary skill in the art. The pump sources can be, for example, diode lasers, coupled to the amplifying optical fiber via pump coupler devices well known to the person of ordinary skill in the art. The person of ordinary skill in the art can select the appropriate pump source for a given optical fiber, depending especially on the wavelength of pump radiation that provides the desired amplified wavelength for the particular amplifying optical fiber.

Figure 5:
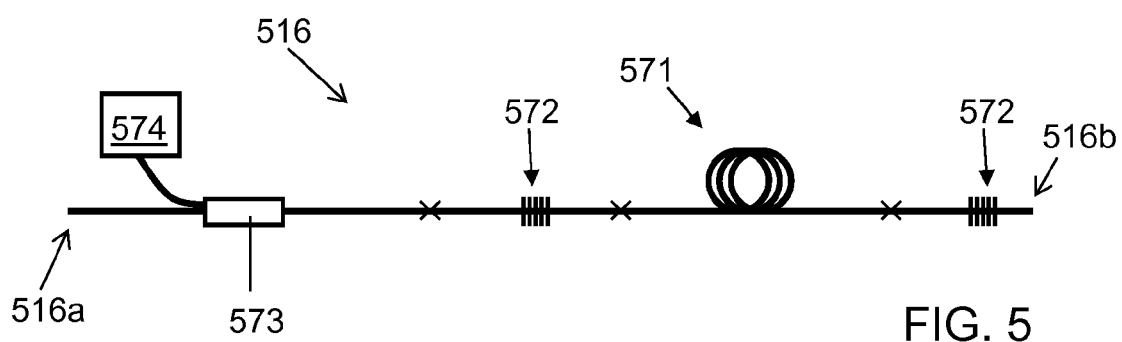
FIG. 5 is a schematic view of an amplifier stage configured as a laser cavity, suitable for use in certain embodiments of the invention.
Figure 6:
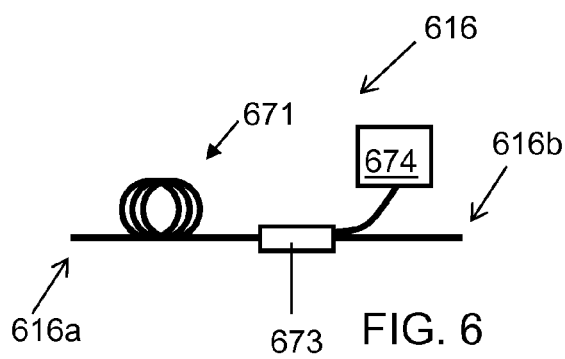
FIG. 6 is a schematic view of an amplifier stage configured as an amplifier, suitable for use in certain embodiments of the invention.

Amplifying and preamplifying stages can be provided in a variety of architectures, and arranged in a variety of ways, as would be apparent to the person of ordinary skill in the art. For example, an amplifying or preamplifying stage can be configured as a laser cavity, with the amplifying optical fiber disposed between two partially reflective optical elements and coupled to a pump source. A partial schematic view of a laser cavity (pre)amplifying stage is provided as FIG. 5. Laser cavity (pre)amplifying stage 516 has input 516a and output 516b, and includes an amplifying optical fiber 571 disposed between partially reflective elements 572 (here, fiber Bragg gratings). A pump coupler 573 couples the pump source 574 to the amplifying optical fiber. In the embodiment of FIG. 5, the pump source is arranged in the so-called "co-pumping" configuration, in which the pump radiation is transmitted through the amplifying optical fiber in the same direction as the input radiation. Of course, the person of ordinary skill in the art will appreciate that the counter-pumping configuration (i.e., with the pump source coupled to the output end of the amplifying optical fiber, such that the pump radiation propagates in the direction opposite the input-output direction of the (pre)amplifying stage) can be used. In other embodiments, both co- and counter-pumping can be provided, and more than one pump source can be provided regardless of the pumping scheme. Alternatively, the (pre)amplification stage can be configured as an amplifier stage, in which there is no laser cavity formed. One example is shown in partial schematic view in FIG. 6. (Pre)amplifying stage 616 has an input 616a and an output 616b, with an amplifying optical fiber 671 extending therebetween. Pump coupler 673 couples pump source 674 to the output end of the amplifying optical fiber (i.e., in the counter-pumping configuration). Regardless of whether the (pre)amplifying stage is a laser cavity stage or an amplifier stage, the person of ordinary skill in the art will configure the (pre)amplifying stage to provide the desired device characteristics. Moreover, the person of ordinary skill in the art will appreciate that more complex architectures can be used in the various (pre)amplifying stages, including Q-switched and/or mode locked architectures.

Figure 4:
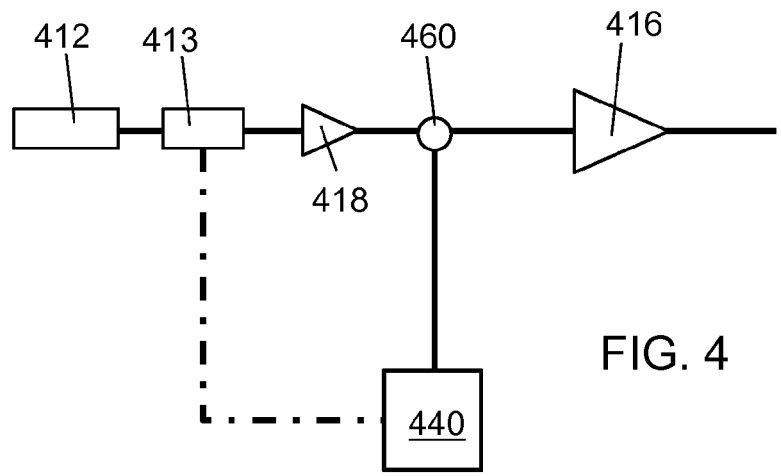
FIG. 4 is a schematic view of an optical fiber amplifying system according to another embodiment of the invention.

The various (pre)amplifying stages in a given system can be arranged in a variety of ways, as the person of ordinary skill in the art will appreciate. For example, in the embodiment of FIG. 2, the amplifying stage 216 can be a fiber laser stage, or alternatively can be an amplifying stage. In the embodiment of FIG. 4, one particular configuration would be for the preamplifying stage 418 to be a fiber laser stage, and the amplifying stage to be an amplifier stage. The person of ordinary skill in the art will appreciate that the so-called MOFA (master oscillator-fiber amplifier) architecture can be used in practicing the present invention. In the MOFA architecture, the output of a seed laser (i.e., the "master oscillator") is amplified by one or more amplifying stages (i.e., the "fiber amplifiers") to provide high power output. As the person of ordinary skill in the art will recognize, the MOFA architecture can be advantaged in several ways. For example, lower power lasers are easier to control than higher power lasers with respect to properties such as linewidth, laser noise, wavelength tenability and pulse generation. Moreover, the higher-power components of the system are configured as amplifiers, and thus do not themselves include laser cavities. The amplifying optical fibers of the amplifying stages need only be able to withstand powers about equal to their output powers (as compared to the much higher intracavity power in a laser cavity configuration). In certain embodiments, e.g., when a relatively low-power seed laser is used, the system can include a plurality of amplifier stages, for example, with increasing mode areas and pump powers along the chain. Thus, in one particular configuration of the embodiment of FIG. 4, both the preamplifying stage 418 and the amplifying stage 416 are configured as amplifiers (i.e., without a laser cavity formed within them).

Figure 7:
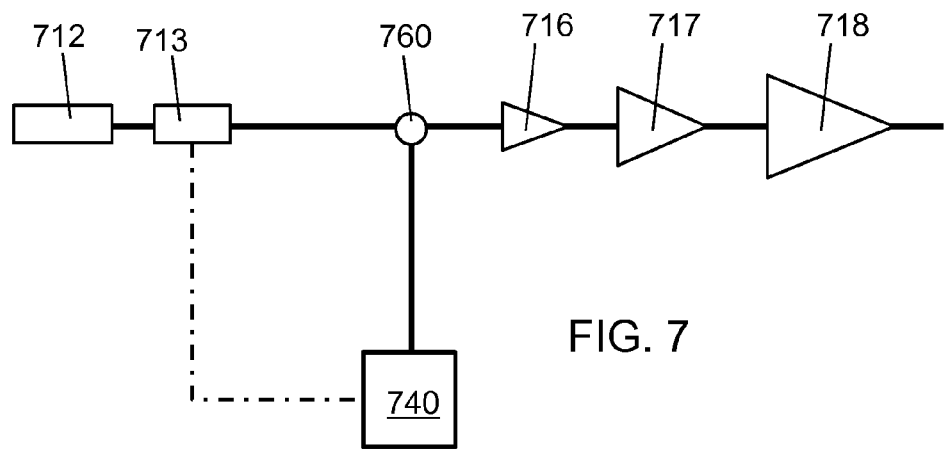
FIG. 7 is a schematic view of an optical fiber amplifying system according to another embodiment of the invention.

Another embodiment of a MOFA-configured system is shown in schematic view in FIG. 7. Here, seed laser 712, polarization controller 713, polarization detector 740 and circulator 760 are substantially as described above with respect to FIG. 4. Instead of a single amplifying stage, the system of FIG. 7 includes a plurality of amplifying stages (here, three amplifying stages 716, 717 and 718) interconnected in series, together having an optical input and an optical output as described above for a single amplifier stage. In certain embodiments, and as shown by the increasing sizes of the schematic elements 716, 717 and 718 in FIG. 7, the plurality of amplifying stages can have increasing mode areas and/or pump powers in order of position from the second port of the circulator.

Figure 8:
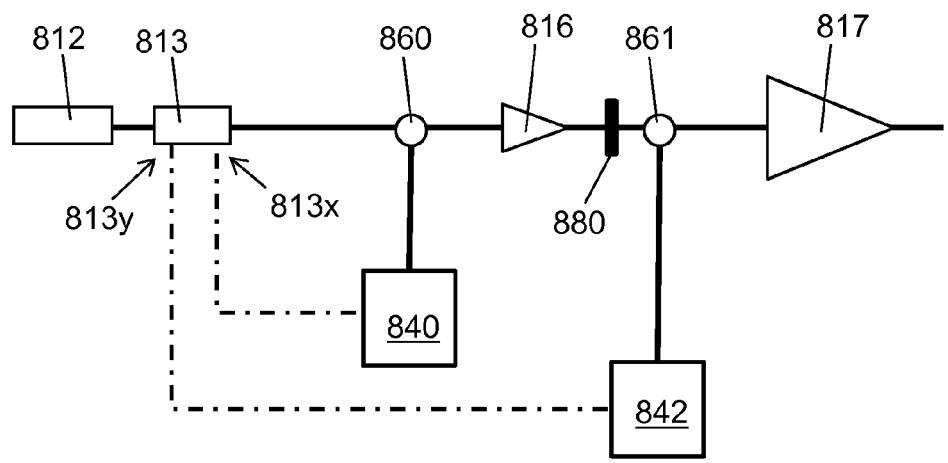
FIG. 8 is a schematic view of an optical fiber amplifying system according to another embodiment of the invention.

In certain embodiments, the polarization state of the amplified radiation is monitored at more than one position. For example, in one embodiment (and as shown in FIG. 8), seed laser 812 is, as described above, optically coupled to a first port of a first circulator 860. The second optical port of the first circulator 860 is optically coupled to the input of a first amplifying stage 816 and the third optical port of the first circulator 860 is optically coupled to the optical input of a first polarization detector 840. The first polarization detector 840 has a detector output configured to output a polarization detector output signal. The output of the first amplifying stage 816 is coupled to the first optical port of a second circulator 861. The second optical port of the second circulator 861 is optically coupled to the input of a second amplifying stage 817 and the third optical port of the second circulator 861 is optically coupled to the optical input of a second polarization detector 842. The second polarization detector 842 has a detector output configured to output a polarization detector output signal. As described above, in each circulator the second optical port is configured to output radiation received from the first optical port, and the third optical port is configured to output radiation received from the second optical port. Of course, as the person of ordinary skill in the art will appreciate, other systems as described herein can include detection of polarization state at multiple points (i.e., of backscattered radiation from one or more of the (pre)amplifying stages) in a fashion similar to that described with respect to FIG. 8. The second amplifier stage can alternatively be provided as a second set of a plurality of amplifier stages, in the manner described above with respect to FIG. 7.

In certain embodiments, and as shown in FIG. 8, an isolator 880 (operating at the backscattered wavelength) can be provided between the first amplifying stage and the second circulator, to prevent backscattered radiation from the second amplifier stage from being received by the first polarization detector. This can be provided in addition to an isolator that isolates the amplified radiation of subsequent amplifying stages, or, as an alternative, the isolator that isolates the amplified radiation of subsequent amplifying stages can have sufficient bandwidth to also isolate the backscattered radiation.

In certain embodiments, and as shown in FIG. 8, the polarization detector output signals of the first and second polarization detectors can be used in the control of the polarization state of the system. For example, as shown in FIG. 8, the system can include a polarization controller 813, with its input optically coupled to the output of the seed laser 812 and its output optically coupled to the first optical port of the first circulator 860. The polarization controller can include one or more controller inputs configured to receive the polarization detector output signals of the first and second polarization detectors. For example, as shown in FIG. 8, the detector output of the first polarization detector 840 can be coupled to a first controller input 813x of the polarization controller 813, and the detector output of the second polarization detector 842 can be coupled to a second controller input 813y of the polarization controller 813. The polarization controller can be configured control the polarization of the radiation of the seed laser (and thus the polarization of the output radiation of the system) based on the polarization detector output signals of the first and second polarization detectors. As the person of ordinary skill in the art will appreciate, the desired polarization state of the output of the second amplifying stage can be controlled using feedback from the detectors 840 and 842.

Figure 9:
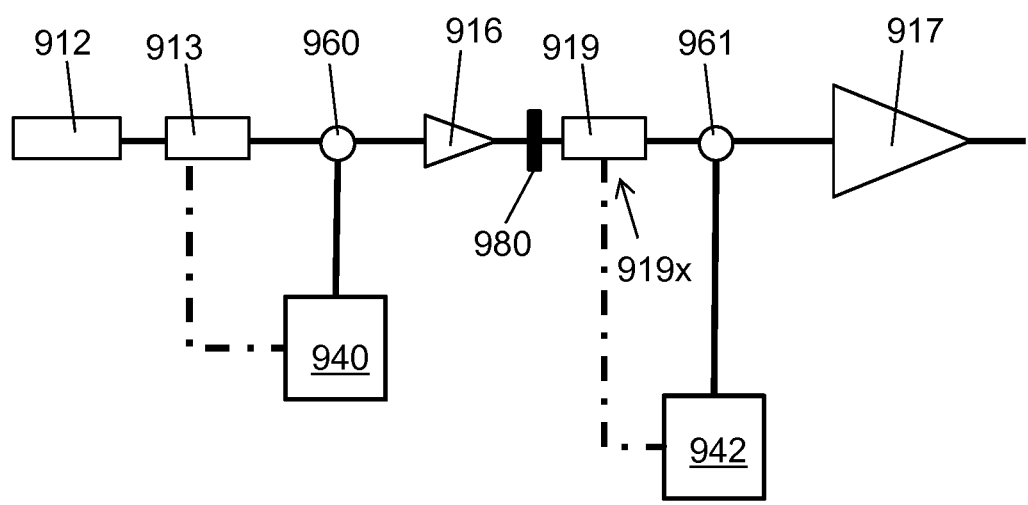
FIG. 9 is a schematic view of an optical fiber amplifying system according to another embodiment of the invention.

In another embodiment, the polarization state of each amplifying stage can be controlled separately. The embodiment of FIG. 9 is configured similarly to that of FIG. 8, but with the detector output of the second polarization detector 942 being coupled to the controller input 919x of a second polarization controller 919 interspersed between the first amplifying stage 916 and the second circulator 961. The seed laser 912, the first polarization controller 913, the first and second circulators 960 and 961, the first and second polarization detectors 940 and 942, the isolator 980 and the first and second amplifying stages 916 and 917 can be as otherwise described with respect to FIG. 8. Accordingly, the polarization state of the output of the system can be feedback controlled via feedback control of not only the polarization of the radiation input to the first amplifying stage, but also the polarization of the radiation input to the second amplifying stage.

Figure 10:
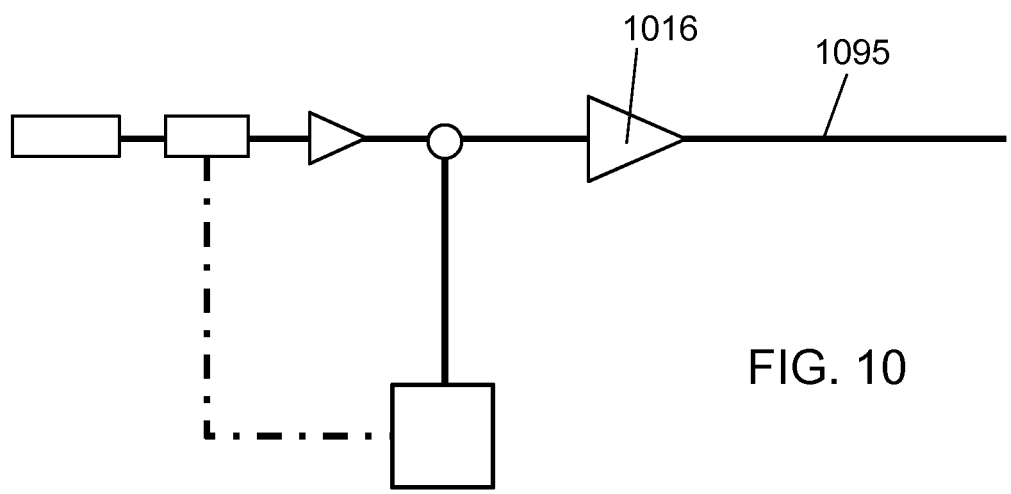
FIG. 10 is a schematic view of an optical fiber amplifying system according to another embodiment of the invention.

In certain embodiments of the systems as described herein, the amplifying optical fibers in the various (pre) amplifying stages need not be polarization-maintaining fibers. Accordingly, in certain embodiments, one or more of the amplifying optical fibers of the amplifying stages and any preamplifying stages are not polarization-maintaining fibers. In one particular embodiment, none of the amplifying optical fibers are polarization-maintaining fibers. The use of polarization detection and/or control as described herein can allow for standard non-polarization-maintaining amplifying optical fibers to be used while still providing for adequate polarization performance. Similarly, in certain embodiments, the passive optical fibers interconnecting the various components need not be polarization-maintaining fibers. Accordingly, in certain embodiments, one or more of the passive optical fibers interconnecting components of the system are not polarization-maintaining fibers. In one particular embodiment, none of the passive optical fibers are polarization-maintaining fibers. Of course, polarization-maintaining fibers can be used as the amplifying optical fibers and/or the passive optical fibers, as would be apparent to the person of ordinary skill in the art. In order to maintain the polarization state of the output of the system, it can be desirable in certain embodiments to optically couple a polarization-maintaining fiber to the output of the last amplifying stage. For example, in the embodiment of FIG. 10, the output of the amplifying stage 1016 is coupled to a polarization-maintaining fiber 1095, which can be used to deliver the polarized radiation to a workpiece or worksite.

Accordingly, in certain aspects the systems described herein can provide for polarization-locking or polarization measurement of the output without interrogation of the output radiation of the amplifier stage(s). This can be particularly important at high powers; in certain embodiments, the output of the amplifier stage(s) is at least about 500 W, at least about 1 kW, at least about 5 kW or even at least about 10 kW of optical power. Similarly, polarization locking without interrogation of the output radiation can be important in combined-beam applications, especially when all beams are desirably identical in order to maximize efficiency. Accordingly, in certain embodiments, a high power optical radiation system includes a plurality of optical fiber amplifying systems as described here (e.g., in which the output of the amplifier stage(s) is at least about 500 W, at least about 1 kW, at least about 5 kW or even at least about 10 kW), wherein the outputs of the systems are combined (e.g., with a fiber coupler, or with free space optics) to form a single output (e.g., a single polarized output), e.g., in the form of a single beam or in the form of a plurality of intersecting beams.

Another aspect of the invention is a method for determining the polarization state of an optical output of an amplifying stage of an optical fiber amplifying system, the amplifying stage having an optical input. The method includes detecting the polarization state of radiation backscattered from the amplifying stage through its optical input to create a polarization detector output signal, and determining the polarization state of the optical output of the amplifying stage using the polarization detector output signal. The methods can be performed, for example, as described throughout this disclosure. Such a method can be performed, for example, using the systems described herein. The method can be described, for example, with respect to the system of FIG. 2. Here, the optical fiber amplifying system has an amplifying stage 216, from which backscattered light is transmitted, through its optical input 216a, to polarization detector 240. The polarization detector 240 detects the polarization state of radiation backscattered from the amplifying stage 216 through its optical input 216a to create a polarization detector output signal, which can then be used to determine the polarization state of the optical output of the amplifying stage, e.g., by processor 241.

Another aspect of the invention is a method for controlling the polarization of the optical output of an amplifying stage of an optical fiber amplifying system, the amplifying stage having an optical input, the optical fiber amplifying system further comprising a polarization controller having an optical input and an optical output optically coupled to the optical input of the amplifying stage, the method comprising detecting the polarization state of radiation backscattered from the amplifying stage through its optical input to create a polarization detector output signal; transmitting the polarization detector output signal to the polarization controller; and controlling the polarization of radiation output from the optical output of the polarization controller based on the polarization detector output signal. For example, in certain embodiments, the polarization of the radiation output from the optical output of the polarization controller is controlled to be polarization-matched to the polarization state of the backscattered light. Such methods can be performed, for example, using the systems described herein. The method can be described, for example, with respect to the system of FIG. 2. Here, the optical fiber amplifying system has an amplifying stage 216, from which backscattered light is transmitted, through its optical input 216a, to polarization detector 240. The polarization detector 240 detects the polarization state of radiation backscattered from the amplifying stage 216 through its optical input 216a to create a polarization detector output signal, which can then be transmitted to the polarization controller 213. Polarization controller 213 can control the polarization of an input signal coupled from the optical input 213a of the polarization controller to the optical output 213b of the polarization controller based on the polarization detector output signal. As the person of ordinary skill in the art will appreciate, by controlling the polarization of the seed laser output with the polarization controller, the polarization of the amplified light can be controlled.

The person or ordinary skill in the art will appreciate that the methods described herein can be performed as described in more detail above with respect to the optical fiber amplifying systems as described herein.

The terms "light", "radiation" and "optical", as used herein, are used broadly as understood by one of ordinary skill in the art of optical waveguides, and are not to be limited as pertaining only to the visible range of wavelengths.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 9th Edition.

It is understood that the use of the term "a", "an" or "one" herein, including in the appended claims, is open-ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

For example, consider that it is disclosed that an optical fiber is initially etched along a length and then part or all of the etched length is bonded to a substrate. The phrase "said optical fiber including a length that is etched to have a reduced diameter, at least a part of said etched length bonded to said substrate", makes it clear that not all of the etched length need be bonded to the substrate. However, the phrase "an optical fiber having an etched length, said etched length being bonded to said substrate", also is not intended to require that all of the initially etched length be bonded to the substrate, regardless whether or not "at least a part of" is used in similar recitations elsewhere in the specification or claims or not.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. An optical fiber amplifying system comprising
   a circulator, the circulator comprising
      a first optical port,
      a second optical port that is configured to output radiation received from the first optical port, and
      a third optical port that is configured to output radiation received from the second optical port;
   one or more amplifier stages connected in series, together having an optical input optically coupled to the second port of the circulator, and an optical output;
   a polarization detector having an optical input optically coupled to the third port of the circulator, and a detector output configured to output a polarization detector output signal, the polarization detector being configured to detect the polarization state of radiation backscattered from the one or more amplifier stages and provide the polarization detector output signal in response to the polarization state of the backscattered radiation; and
   a polarization controller having an optical input, an optical output, and a controller input,
      the first optical port being optically coupled to the optical output of the polarization controller,
      the polarization controller including a controller input, the polarization detector output signal being coupled to the controller input of the polarization controller, and
      the polarization controller being configured to control the polarization of an input signal coupled from its optical input to its optical output based on the polarization detector output signal received at the controller input.

2. The optical fiber amplifying system according to claim 1, further comprising a seed laser having an output coupled to the first optical port of the circulator.

3. The optical fiber amplifying system according to claim 2, wherein the output of the seed laser is coupled to the optical input of the polarization controller.

4. The optical fiber amplifying system according to claim 1, wherein one or more preamplifying stages are coupled in the optical path that is coupled to the circulator at its first optical port.

5. The optical fiber amplifying system according to claim 1, further including a processor configured to determine the polarization state of the optical output of the one or more amplifier stages using the polarization detector output signal.

6. The optical fiber amplifying system according to claim 1, wherein one or more preamplifying stages are coupled in the optical path between the polarization controller and the first optical port of the circulator.

7. The optical fiber amplifying system according to claim 1, wherein the one or more amplifier stages are a plurality of amplifying stages are optically coupled in series to the second port of the circulator.

8. The optical fiber amplifying system according to claim 7, wherein the plurality of amplifying stages have increasing mode areas and/or pump powers in order of position from the second port of the circulator.

9. The optical fiber amplifying system according to claim 1, wherein the one or more amplifier stages are a single amplifying stage optically coupled to the second port of the circulator.

10. The optical fiber amplifying system according to claim 1, wherein the device further comprises
    a second circulator, the second circulator comprising
       a first optical port optically coupled to the optical output of the one or more amplifier stages,
       a second optical port that is configured to output radiation received from the first optical port, and
       a third optical port that is configured to output radiation received from the second optical port;
    a second set of one or more amplifier stages together having an optical input optically coupled to the second port of the second circulator, and an optical output; and
    a second polarization detector having an optical input optically coupled to the third port of the second circulator, and a detector output configured to output a polarization detector output signal.

11. The optical fiber amplifying system of claim 10, wherein the polarization controller includes a second controller input; and the detector output of the second polarization detector is coupled to the second controller input of the polarization controller.

12. The optical fiber amplifying system according to claim 10, further comprising a second polarization controller coupled in the optical path between the output of the one or more amplifying stages and the second circulator, the second polarization controller having an optical input coupled to the optical output of the one or more amplifying stages, an optical output coupled to the first port of the second circulator, and a controller input coupled to the detector output of the second polarization controller.

13. The optical fiber amplifying system according to claim 1, wherein each amplifying stage and each preamplifying stage includes one or more amplifying optical fibers, and wherein one or more of the amplifying optical fibers are not polarization-maintaining optical fibers.

14. The optical fiber amplifying system according to claim 1, further comprising a polarization-maintaining fiber optically coupled to the output of the last amplifying stage.

15. The optical fiber amplifying system according to claim 1, configured to output at least 5 kW of optical power.

16. A high power optical radiation system comprising a plurality of optical fiber amplifying systems according to claim 1, wherein the outputs of the optical fiber amplifying systems are combined to form a single output beam.

17. A method for controlling the polarization of an optical output of an amplifying stage of an optical fiber amplifying system, the amplifying stage having an optical input, the optical fiber amplifying system further comprising a polarization controller having an optical input and an optical output optically coupled to the optical input of the amplifying stage, the method comprising
    detecting the polarization state of radiation backscattered from the amplifying stage through its optical input to create a polarization detector output signal;
    transmitting the polarization detector output signal to the polarization controller; and
    controlling the polarization of radiation output from the optical output of the polarization controller based on the polarization detector output signal.

18. The method according to claim 17, wherein the polarization of the radiation output from the optical output of the polarization controller is controlled to be polarization-matched to the polarization state of the backscattered light.

19. A method for determining the polarization state of an optical output of an amplifying stage of an optical fiber amplifying system, the amplifying stage having an optical input, the method comprising
    detecting the polarization state of radiation backscattered from the amplifying stage through its optical input to create a polarization detector output signal; and
    determining the polarization state of the optical output of the amplifying stage using the polarization detector output signal.

20. The method according to claim 17, wherein the radiation backscattered from the amplifying stage is Brillouin-scattered radiation.

21. The method according to claim 19, wherein the optical fiber amplifying system comprises
    a circulator, the circulator comprising
        a first optical port,
        a second optical port that is configured to output radiation received from the first optical port, and
        a third optical port that is configured to output radiation received from the second optical port;
    one or more amplifier stages connected in series, together having an optical input optically coupled to the second port of the circulator, and an optical output;
    a polarization detector having an optical input optically coupled to the third port of the circulator, and a detector output configured to output a polarization detector output signal, the polarization detector being configured to detect the polarization state of radiation backscattered from the one or more amplifier stages and provide the polarization detector output signal in response to the polarization state of the backscattered radiation.

22. The method according to claim 20, wherein the optical fiber amplifying system further comprises
    a second circulator, the second circulator comprising
        a first optical port optically coupled to the optical output of the one or more amplifier stages,
        a second optical port that is configured to output radiation received from the first optical port, and
        a third optical port that is configured to output radiation received from the second optical port;
    a second set of one or more amplifier stages together having an optical input optically coupled to the second port of the second circulator, and an optical output; and
    a second polarization detector having an optical input optically coupled to the third port of the second circulator, and a detector output configured to output a polarization detector output signal.

23. The method according to claim 20, wherein the optical fiber amplifying system further comprises a seed laser having an output coupled to the first optical port of the circulator.

24. The method according to claim 17, wherein the optical fiber amplifying system comprises
    a circulator, the circulator comprising
        a first optical port,
        a second optical port that is configured to output radiation received from the first optical port, and
        a third optical port that is configured to output radiation received from the second optical port;
    one or more amplifier stages connected in series, together having an optical input optically coupled to the second port of the circulator, and an optical output;
    a polarization detector having an optical input optically coupled to the third port of the circulator, and a detector output configured to output a polarization detector output signal, the polarization detector being configured to detect the polarization state of radiation backscattered from the one or more amplifier stages and provide the polarization detector output signal in response to the polarization state of the backscattered radiation; and
    a polarization controller having an optical input, an optical output, and a controller input,
        the first optical port being optically coupled to the optical output of the polarization controller,
        the polarization controller including a controller input, the polarization detector output signal being coupled to the controller input of the polarization controller, and
        the polarization controller being configured to control the polarization of an input signal coupled from its optical input to its optical output based on the polarization detector output signal received at the controller input.

25. The method according to claim 24, wherein the optical amplifying system further comprises a second circulator, the second circulator comprising
   a first optical port optically coupled to the optical output of the one or more amplifier stages,
   a second optical port that is configured to output radiation received from the first optical port, and
   a third optical port that is configured to output radiation received from the second optical port;
a second set of one or more amplifier stages together having an optical input optically coupled to the second port of the second circulator, and an optical output; and
a second polarization detector having an optical input optically coupled to the third port of the second circulator, and a detector output configured to output a polarization detector output signal, and wherein the polarization controller includes a second controller input; and the detector output of the second polarization detector is coupled to the second controller input of the polarization controller.

26. The optical fiber amplifying system according to claim 24, further comprising a seed laser having an output coupled to the first optical port of the circulator, wherein the output of the seed laser is coupled to the optical input of the polarization controller.

\* \* \* \* \*